(12) United States Patent
Alhorn et al.

(10) Patent No.: US 7,116,098 B1
(45) Date of Patent: Oct. 3, 2006

(54) SYSTEM PROVIDING LIMIT SWITCH FUNCTION WITH SIMULTANEOUS ABSOLUTE POSITION OUTPUT

(75) Inventors: Dean C. Alhorn, Huntsville, AL (US); David E. Howard, Hazel Green, AL (US); Dennis A. Smith, Athens, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 11/357,454

(22) Filed: Feb. 16, 2006

(51) Int. Cl.
G01B 7/14 (2006.01)
(52) U.S. Cl. .................. 324/207.24; 324/244
(58) Field of Classification Search ........... 324/207.24, 324/244
See application file for complete search history.

(56) References Cited

U.S. PATENT DOCUMENTS

| | | |
|---|---|---|
| 3,054,296 A | 9/1962 | Hargens et al. |
| 3,126,745 A | 3/1964 | Lutke |
| 3,184,975 A | 5/1965 | Lindemann et al. |
| 3,244,977 A | 4/1966 | Folsom |
| 3,379,972 A | 4/1968 | Foster et al. |
| 3,964,317 A | 6/1976 | Blanchard |
| 4,400,978 A | 8/1983 | Guay et al. |
| 4,497,205 A | 2/1985 | Zulauf et al. |
| 4,747,317 A | 5/1988 | Lara |
| 5,440,499 A | 8/1995 | Rasmussen |
| 6,104,328 A | 8/2000 | Alhorn et al. |
| 6,125,697 A | 10/2000 | Holton et al. |
| 6,246,228 B1 | 6/2001 | Alhorn et al. |
| 6,418,788 B1 | 7/2002 | Articolo |
| 6,597,167 B1 * | 7/2003 | Miyata et al. ......... 324/207.17 |
| 6,628,115 B1 * | 9/2003 | Sasaki et al. .......... 324/207.17 |
| 2001/0029782 A1 | 10/2001 | Articolo |

FOREIGN PATENT DOCUMENTS

| | | |
|---|---|---|
| JP | 11297591 A | 10/1999 |
| JP | 2002162252 A | 6/2002 |

* cited by examiner

*Primary Examiner*—Bot LeDynh
(74) *Attorney, Agent, or Firm*—James J. McGroary; Peter J. Van Bergen (57) ABSTRACT

A limit and position sensing system includes a sensor assembly and an emitter. The sensor assembly includes first and second electrical conductors arranged in opposing parallel planes. The first electrical conductor is coiled outwardly from either end thereof in a clockwise fashion to form a first coil region and a second coil region. The second electrical conductor forms a single coil with portions of the single coil's rings lying between the first end and second end of the first electrical conductor being parallel to an axis of the first electrical conductor's plane. Ferromagnetic material is aligned with the first and second electrical conductors and spans beyond (a) the first and second ends of the first electrical conductor, and (b) the portions of the rings of the second electrical conductor's single coil that lie between the first end and second end of the first electrical conductor. The emitter is spaced apart from the sensor assembly and transmits a periodic electromagnetic wave towards the sensor assembly.

18 Claims, 7 Drawing Sheets

SYSTEM PROVIDING LIMIT SWITCH FUNCTION WITH SIMULTANEOUS ABSOLUTE POSITION OUTPUT

ORIGIN OF THE INVENTION

The invention was made by employees of the United States Government and may be manufactured and used by or for the Government for governmental purposes without the payment of any royalties thereon or therefore.

BACKGROUND OF THE INVENTION

1. Field of the Invention

This invention relates to limit switches. More specifically, the invention is a system that can function as a limit switch and simultaneously provide a signal indicative of absolute position along a linear axis.

2. Description of the Related Art

In a wide variety of motorized systems, a system operation (e.g., stopping the system's motor) is triggered when a limit switch is tripped. Generally, a limit switch is configured to detect when a system's element has traveled/moved to a certain position. Since the system element is moving, inertia frequently causes the element to move past the limit switch thereby causing a condition known as "system overrun". When this occurs, the exact position of the element is unknown and techniques must be implemented to locate the element relative to the known limit switch position. Such techniques include use of separate position sensors or search routines. However, the use of separate position sensors adds size, weight and complexity to a system's limit switch function, while search routines cause time delays in system operations.

SUMMARY OF THE INVENTION

Accordingly, it is an object of the present invention to provide a limit and position sensing system.

Another object of the present invention is to provide a system that simultaneously generates both a limit switch type signal and a signal indicative of absolute position.

Other objects and advantages of the present invention will become more obvious hereinafter in the specification and drawings.

In accordance with the present invention, a limit and position sensing system includes a sensor assembly and an emitter. The sensor assembly includes first and second electrical conductors and ferromagnetic material. The first electrical conductor is arranged in a first plane, is coiled outwardly in a clockwise fashion starting at its first end to form a first coil region, and is coiled outwardly in a clockwise fashion starting at its second end to form a second coil region. Uniform spacing is defined between rings of the first and second coil regions along an axis of the first plane. The second electrical conductor is arranged in a second plane parallel to the first plane, and forms a single coil with rings thereof being uniformly-spaced. Portions of the rings of the single coil that lie between the first end and second end of the first electrical conductor are parallel to the first plane's axis. The ferromagnetic material is arranged in a third plane parallel to the first and second planes. The ferromagnetic material is aligned with the first coil region, second coil region, and single coil such that the ferromagnetic material spans beyond (a) the first and second ends of the first electrical conductor, and (b) the portions of the rings of the single coil that lie between the first end and second end of the first electrical conductor and are parallel to the first plane's axis. The emitter is spaced apart from the sensor assembly. The emitter transmits a periodic electromagnetic wave towards the sensor assembly such that the wave is incident on the first and second electrical conductors prior to being incident on the ferromagnetic material. The system's sensor assembly produces an output signal that varies depending on the location of the emitter along the axis of the first plane. The output signal can be used to provide a limit switch function and identify the position of the emitter along the axis of the first plane.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
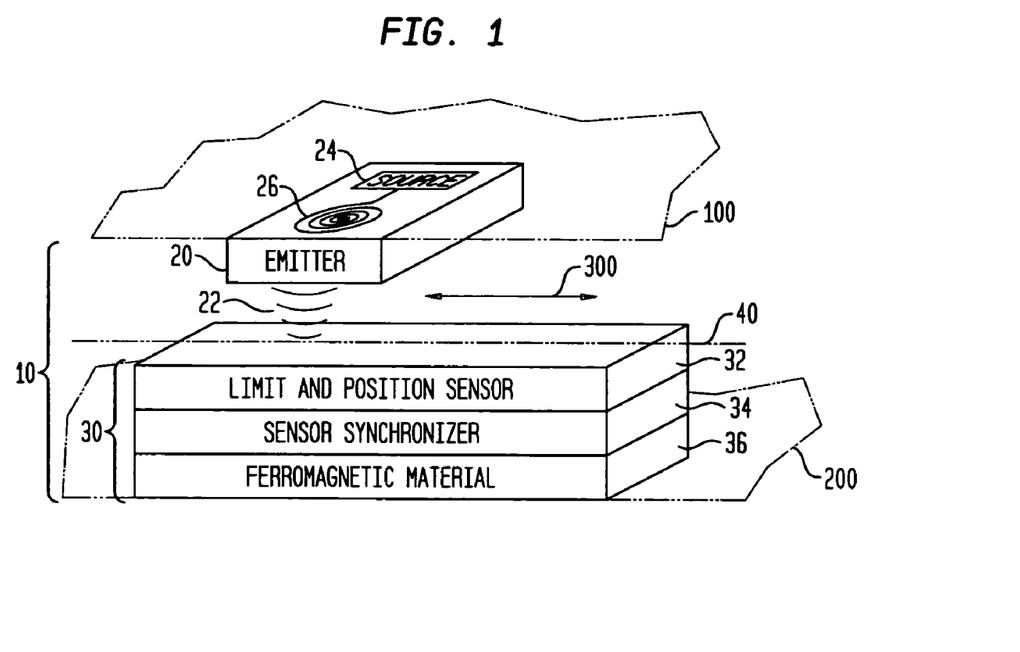
FIG. 1 is a schematic view of a limit and position sensing system in accordance with an embodiment of the present invention.

Referring now to the drawings, and more particularly to FIG. 1, a limit and position sensing system in accordance with an embodiment of the present invention is referenced generally by numeral 10. System 10 provides an output signal that can be used to trigger a limit switch function while simultaneously indicating absolute position. In general, system 10 has an emitter 20 coupled to a structure 100 and a sensor assembly 30 coupled to a structure 200. Structures 100 and 200 are two spaced-apart structures and are shown in phantom to indicate that they do not comprise elements of system 10. Structures 100 and 200 are capable of relative movement (e.g., only structure 100 moves, only structure 200 moves, or both structures 100 and 200 move) along a linear direction represented by two-headed arrow 300.

As will be explained in greater detail below, sensor assembly 30 has an inherent sensing axis 40. Sensor assembly 30 is positioned on structure 200 such that sensing axis 40 is parallel to linear direction 300. Emitter 20 is positioned on structure 100 such that it is substantially aligned with sensing axis 40 as structures 100 and 200 experience relative movement along linear direction 300. Emitter 20 and sensor assembly 30 are separated by a gap that remains substantially constant as structures 100 and 200 experience relative movement along linear direction 300. Emitter 20 transmits a periodic wave 22 of electromagnetic energy towards sensor assembly 30 as structures 100 and 200 experience relative movement along linear direction 300. The frequency and shape (e.g., sinusoidal, triangular, square, etc.) of periodic wave 22 are not limitations of the present invention.

Briefly, in operation, emitter 20 transmits periodic wave 22 towards sensor assembly 30 as structures 100 and 200 experience relative movement along linear direction 300. Sensor assembly 30 produces a response (i.e., an electrical signal) in the presence of periodic wave 22 that can simultaneously indicate (i) when a particular relative reference position between structures 100 and 200 has been attained as a result of relative movement therebetween along linear direction 300 (i.e., a limit switch function), and (ii) the absolute position of emitter 20 relative to the reference position.

Emitter 20 can be any device capable of transmitting a period electromagnetic wave 22 therefrom. For example, emitter 20 could be realized by an excitation signal source 24 coupled to an excitation coil 26. The excitation coil could be put on a printed wiring board (not shown) or similar configuration. Two excitation coils could be used to balance the signal, but are not necessary. The coil could be micromachined from a silicon die source for MEMS applications. Thus, it is to be understood that the present invention could be realized using a variety of other types of devices to generate/transmit periodic wave 22 without departing from the scope of the present invention as would be understood by one of ordinary skill in the art.

Figure 2:
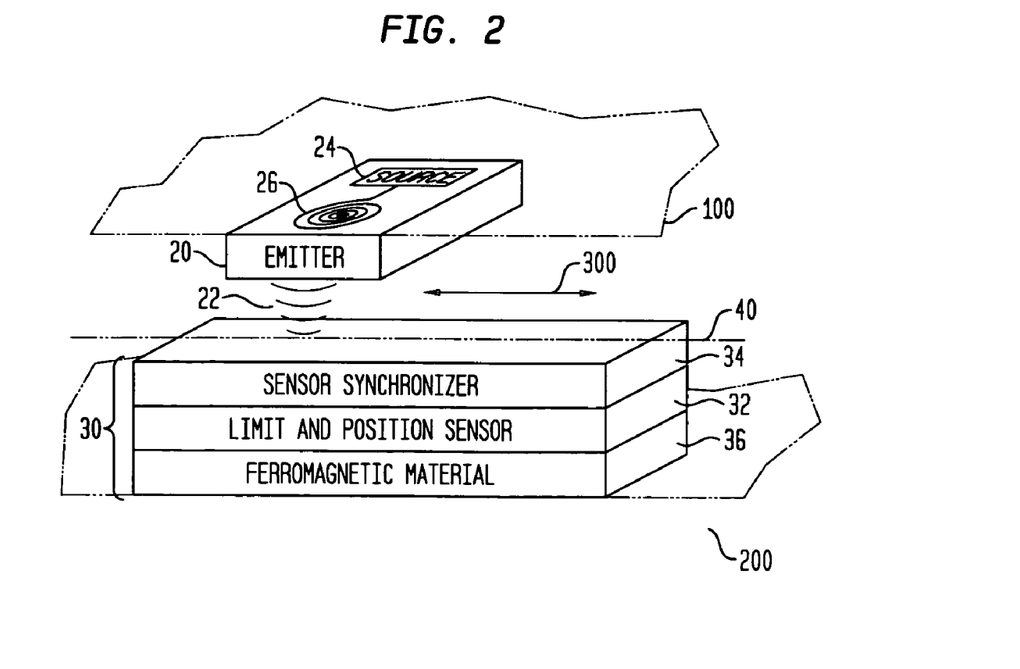
FIG. 2 is a schematic view of the limit and position sensing system in accordance with another embodiment of the present invention.

Sensor assembly 30 combines a number of unique innovations for its use in system 10. In general, sensor assembly 30 includes (i) a limit and position sensor 32 that generates the signal that can be interpreted by conventional electronics (not shown) to simultaneously provide a limit switch function and absolute position information, (ii) a sensor synchronizer 34 that essentially transfers the phase information associated with periodic wave 22 to sensor assembly 30, and (iii) ferromagnetic material 36 that improves the electromagnetic sensitivity of sensor assembly 30 by collimating/focusing the electromagnetic field (associated with periodic wave 22) incident on sensor 32/coil 34 and providing a flux return path to emitter 20. Note that the positions of sensor 32 and 34 relative to emitter 20 can be reversed (as shown in FIG. 2) without departing from the scope of the present invention.

Figure 3:
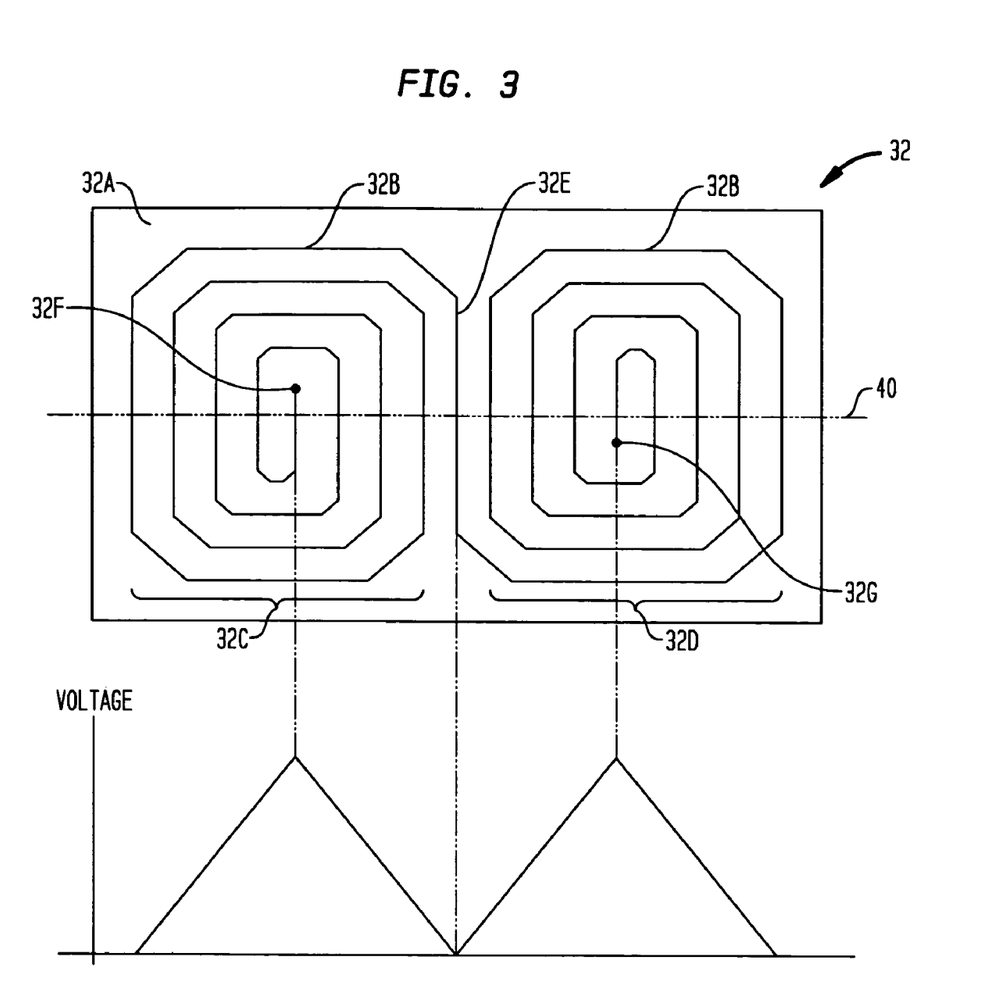
FIG. 3 is a plan view of the limit and position sensor along with a plot of the sensor's output magnitude when the sensor is exposed to a periodic electromagnetic wave in accordance with the present invention.

Limit and position sensor 32 is illustrated in greater detail in a plan view thereof in FIG. 3. Typically, sensor 32 includes a non-electrically conductive planar substrate 32A on which a electrical conductor 32B is supported. For example, substrate 32A can be a conventional printed wiring board substrate with electrical conductor 32B being a conductive run "printed" thereon as would be well understood in the art. However, it is to be understood that the sensor 32 could be constructed in a variety of other ways (e.g., made on a silicon dye for MEMS applications) without departing from the scope of the present invention.

Regardless of the particular construction of sensor 32, conductor 32B is a single electrical conductor lying in a plane (e.g., the surface plane of substrate 32A) with conductor 32B terminating at ends 32F and 32G. Conductor 32B is arranged to form two planar coil regions 32C and 32D. In coil region 32C, conductor 32B is coiled outwardly from end 32F in a clockwise fashion. In coil region 32D, conductor 32B is coiled outwardly in a clockwise fashion from end 32G. Coil regions 32C and 32D are electrically coupled to one another at an interior region 32E of conductor 32B. The above-described sensing axis 40 lies in the plane of conductor 32B and extends through the central portions of coil regions 32C and 32D as illustrated. Along axis 40, the spacing between adjacent runs of conductor 32B (i.e., adjacent rings of the coils defined by coil regions 32C/32D and interior region 32E) is uniform. Although not a requirement of the present invention, the number of rings formed by conductor 32B in coil region 32C will typically match the number of rings formed by conductor 32B in coil region 32D.

When the above-described sensor 32 is exposed to a periodic electromagnetic wave (e.g., wave 22 from emitter 20) from a position substantially aligned along axis 40 and spaced apart from sensor 32, a voltage is induced in one of coil regions 32C and 32D depending on where the wave originates along axis 40. As evidenced by the graph of output magnitude in FIG. 3, the magnitude of the induced voltage indicates where the electromagnetic wave originated. For the illustrated example of coil regions 32C and 32D having an equal number of rings, if the electromagnetic wave originates at a positioned aligned with interior region 32E, a zero output is produced when the output signal is tapped across ends 32F and 32G of conductor 32B. Thus, in this example, interior region 32E defines the null point of sensor 32.

The sensor's output magnitude increases from the sensor's null point (e.g., at interior region 32E) as the electromagnetic wave source moves along linear direction 300 towards either of the central portions of coil regions 32C or 32D with a peak magnitude at each coil region's central portion. Finally, the sensor's output magnitude in coil region 32C decreases from the peak as the electromagnetic wave source moves further to the left and away from interior region 32E, while the sensor's output magnitude in coil region 32D decreases from the peak as the electromagnetic wave source moves further to the right and away from interior region 32E.

As previously mentioned, coil regions 32C and 32D will typically have the same number of rings thereby yielding a zero or null point at the centrally positioned interior region 32E. However, if one coil region has more rings than the other, the sensor's zero or null point will simply shift to the coil region with the greater number of rings.

The limit switch function capabilities of the present invention would be readily apparent to one of ordinary skill in the art after referring to FIG. 3. Specifically, the graph in FIG. 3 illustrates that the null point of sensor 32 or any other set voltage level could be used to trigger one or more limit switch functions. For example, in the FIG. 3 embodiment, the peak voltages could be used to trigger the ends or limits of travel whereas the null point could be used to trigger when the midpoint of travel between ends 32F and 32G has been reached.

As is also clearly evident from the graph in FIG. 3, the position information provided by the output magnitude is ambiguous as a magnitude value could be indicative of up to four different positions along axis 40. The number of ambiguous magnitude values can be reduced to two if sensor 32 is configured such that relative movement between sensor 32 and emitter 20 (not shown in FIG. 3) will only occur between the central portions of coil regions 32C and 32D (i.e., between the two peak output magnitudes). To eliminate the ambiguity, it is necessary to look at the phase of the voltage induced in one of coil regions 32C and 32D. That is, the output voltage of sensor 32 is in phase relative to the phase of the emitter's periodic electromagnetic wave (i.e., wave 22) when the wave is positioned over one coil region, but is 180° out-of-phase relative to the phase of the emitter's periodic electromagnetic wave when the wave originates from a position over the other coil region. For example, if coil region 32D produces an output voltage that is in phase relative to the emitter's excitation voltage of $A[\sin(\omega t)]$, the output voltage induced in coil region 32D is of the form $K(x)*A[\sin(\omega t)]$ where $K(x)$ varies with the position x along axis 40. In contrast, the output voltage induced in coil region 32C will be 180° out-of-phase with the excitation voltage so that the output voltage induced in coil region 32C (when emitter 20 is positioned thereover) is of the form $-K(x)*A[\sin(\omega t)]$.

Figure 4:
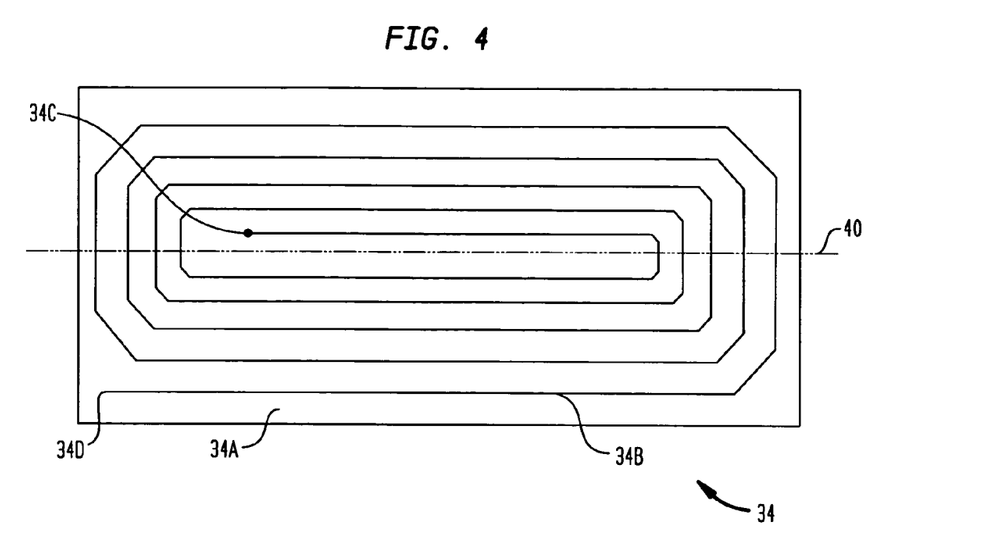
FIG. 4 is a plan view of the synchronization coil used in the sensor assembly of the present invention.

Since the phase of the output voltage induced in sensor 32 is relative to the emitter's excitation voltage, the phase of such excitation voltage must also be known. This can be achieved by tapping into the emitter's inputs. However, the disadvantage of this is that emitter 20 and sensor assembly 30 essentially become mechanically limited. This may not be desirable in many moving structure applications. Accordingly, the present invention overcomes this problem through the use of sensor synchronizer 34. By way of example, a plan view of sensor synchronizer 34 is shown in FIG. 4 where a non-electrically conductive planar substrate 34A supports an electrical conductor 34B. Similar to substrate 32A/conductor 32B, a variety of technologies can be utilized to construct substrate 34A/conductor 34B without departing from the scope of the present invention.

Figure 5:
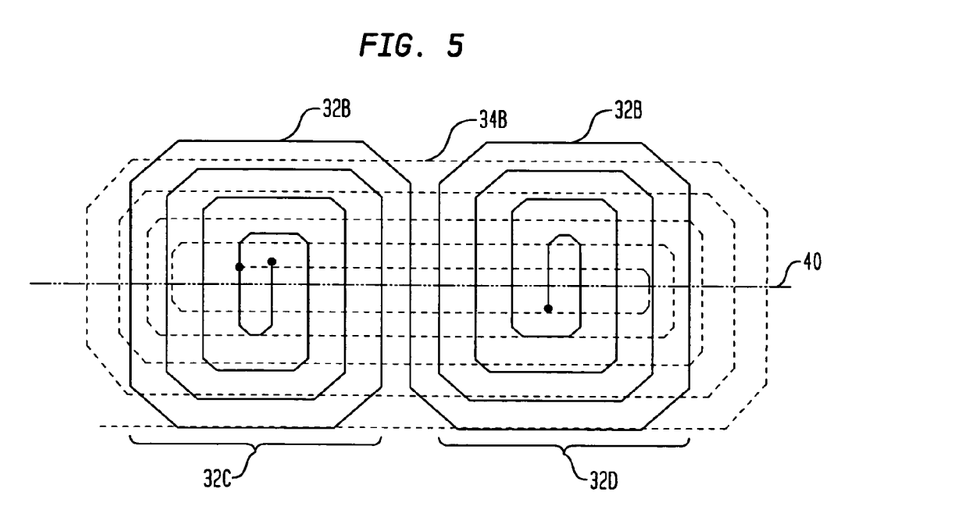
FIG. 5 is an isolated plan view of the synchronization coil overlaid on an isolated plan view of the limit and position sensor.

Regardless of the particular construction of sensor synchronizer 34, conductor 34B is a single electrical conductor lying in a plane (e.g., the surface plane of substrate 34A). Conductor 34B is arranged to form a single planar coil having multiple rings as shown. Sensor synchronizer 34 is aligned with sensor 32. Specifically, the portions of the rings (formed by conductor 34B) that span the useful sensitivity of sensor 32 (e.g., between the center portions of coil regions 32C and 32D as described above) are uniformly-spaced and parallel to one another. This situation is depicted in FIG. 5 where conductor 34B is depicted as a dashed line overlaid on conductor 32B.

In operation, as a periodic electromagnetic wave (e.g., wave 22) is incident on conductor 34B from a position along axis 40, a voltage is induced in conductor 34B with the induced voltage (e.g., measured at ends 34C and 34D) being in-phase with that of the emitter's periodic electromagnetic wave. In this way, sensor synchronizer 34 provides the comparative phase information necessary to resolve the previously-described position ambiguity generated by the output magnitude of sensor 32. In other words, sensor synchronizer 34 transfers the phase of the emitter signal to the sensor side of system 10.

In addition, the output signal generated by conductor 34B is nearly constant for a particular fixed gap between emitter 20 and conductor 34B, but changes for a different gap distance. Thus, the output signal produced by conductor 34B can be used to measure the gap (between emitter 20 and conductor 34B) and calibrate sensor assembly 30 for use in, for example, system 10.

Figure 6:
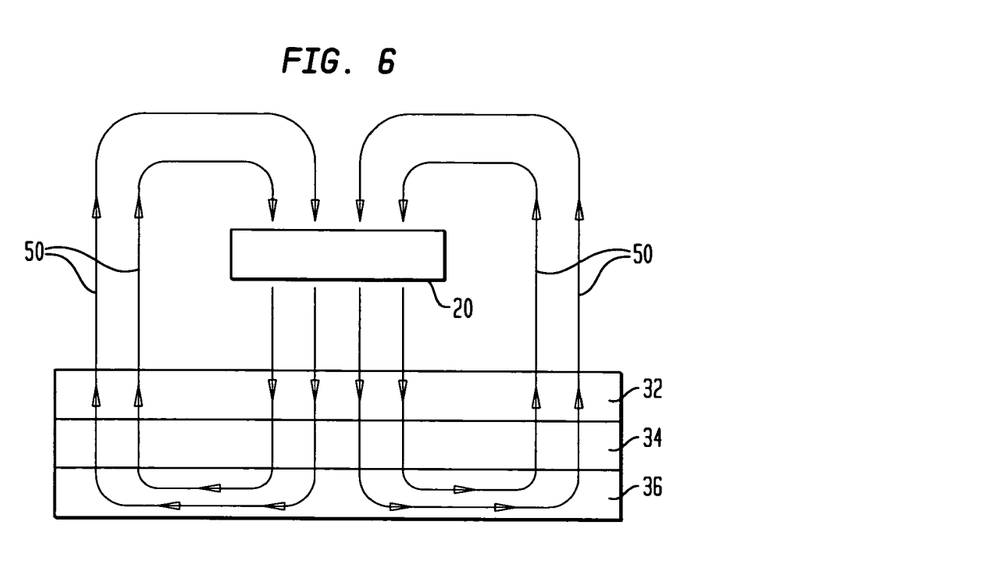
FIG. 6 is a side schematic view of the limit and position sensing system illustrating the magnetic flux lines of the magnetic fields in the present invention.

Referring additionally now to FIG. 6, ferromagnetic material 36 operates to focus/collimate magnetic flux (represented by lines 50) as the magnetic energy is incident on and passes through sensor 32/synchronizer 34. Note that either sensor 32 or synchronizer 34 could be positioned closer to emitter 20 as previously described. Ferromagnetic material 36 further serves as a flux return path that facilitates the wrapping of flux 50 back to emitter 20 to thereby complete the electromagnetic circuit.

Figure 7:
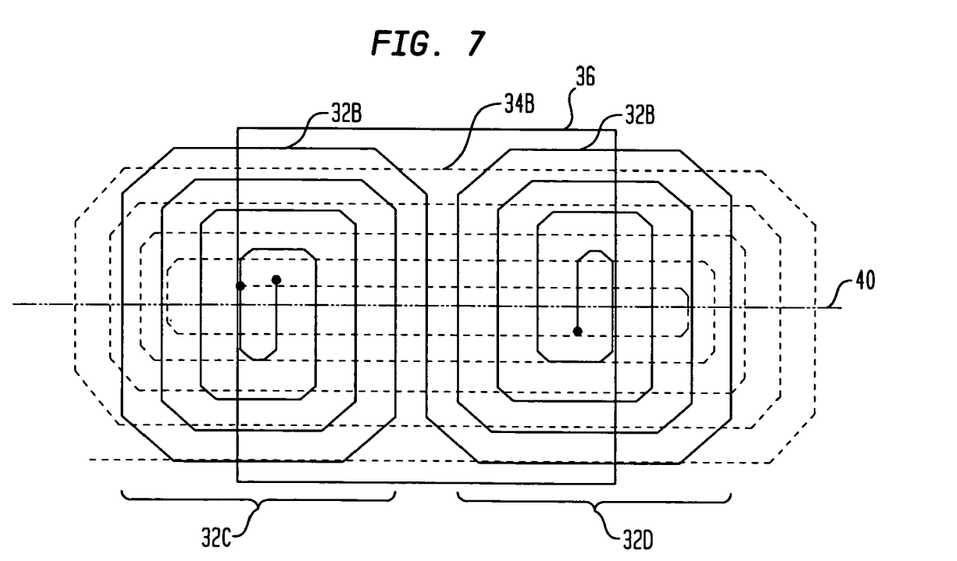
FIG. 7 is an isolated plan view illustrating the possible positioning of the ferromagnetic material overlaid on isolated plan view of synchronization coil and the limit and position sensor.

Ferromagnetic material 36 should be aligned with those portions of conductors 32B and 34B that define the sensitive range of sensor assembly 30. Typically, as illustrated in FIG. 7, this means that ferromagnetic material 36 spans at least to the center portions of coil regions 32C and 32D as well as the portions of the rings of conductor 34B that lie between the center portions of coil regions 32C and 32D. To avoid edge effects, it may be desirable to have ferromagnetic material 36 span beyond the usable sensitive area of sensor 32/synchronizer 34.

Ferromagnetic material 36 is any material capable of collimating/focusing magnetic flux and providing a flux return path. For example, material 36 could be a layer of mu-metal as it can transport a large amount of magnetic flux even in thin sheets thereof. However, other ferromagnetic materials could be used without departing from the scope of the present invention. Further, material 36 can be provided in the construction of sensor assembly 30, or could be provided by virtue of the material surface of the structure to which sensor 32/synchronizer 34 are attached (e.g., structure 200 in FIGS. 1 and 2).

Figure 8:
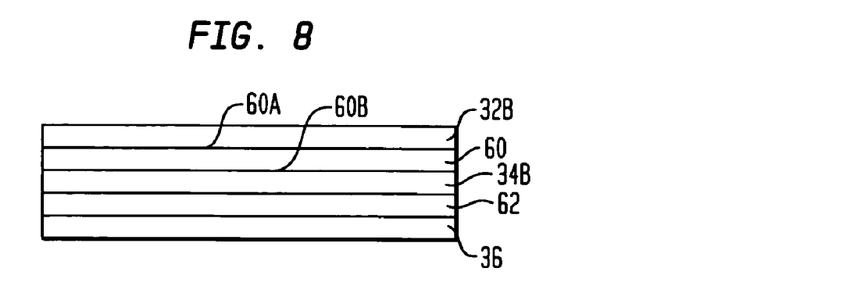
FIG. 8 is a side schematic view of a multilayer construction of the sensor assembly in accordance with an embodiment of the present invention.
Figure 9:
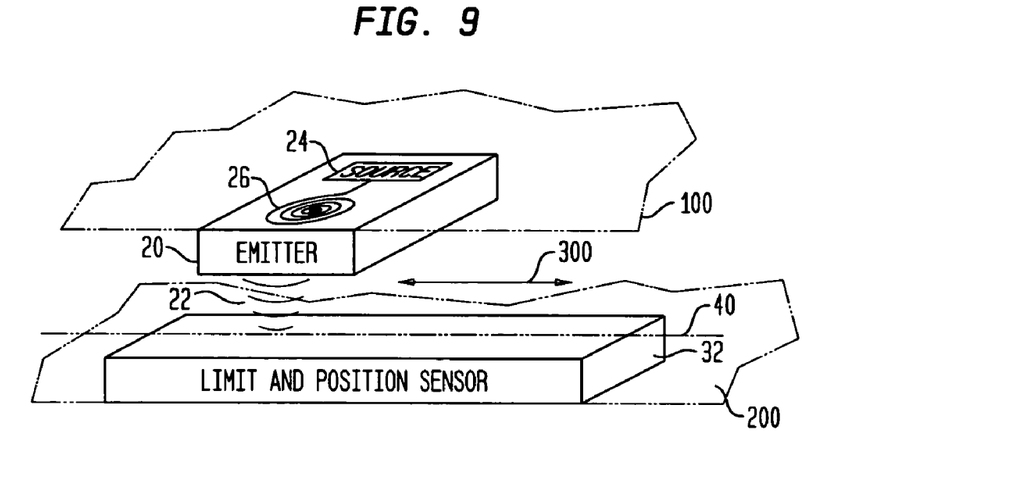
FIG. 9 is a schematic view of a limit and position sensing system in accordance with another embodiment of the present invention.
Figure 10:
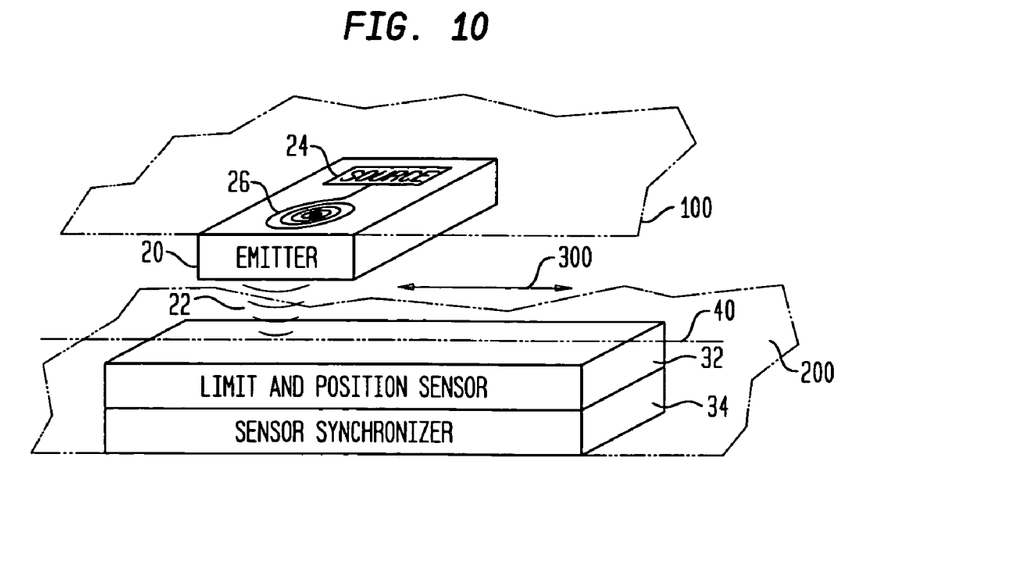
FIG. 10 is a schematic view of a limit and position sensing system in accordance with yet another embodiment of the present invention.

As has been mentioned throughout this description, sensor assembly 30 can be constructed in a variety of ways. For example, FIG. 8 illustrates a multilayer construction where an electrically non-conductive layer 60 separates conductors 32B and 34B, and an electrically non-conductive 62 separates conductor 34B and ferromagnetic material 36. Layer 60 could have opposing and parallel planar sides 60A/60B with conductor 32B "printed" on side 60A and conductor 34B "printed" on side 60B. Coupling to the various ends of conductors 32B and 34B could be accomplished by a variety of techniques well understood in the art.

The advantages of the present invention are numerous. A single sensor provides a limit switch function and absolute position information from the same output. The system is simple and lends itself to miniaturization. The system is a non-contact system thereby greatly reducing the problems inherent in mechanically-based limit and position sensing systems.

The innovations provided by the present invention extend beyond the limit and position sensing system embodiment described herein. That is, some applications may not require all of the features of the above-described sensor assembly 30 as will now be explained briefly with the aid of FIGS. 9–13.

Figure 11:
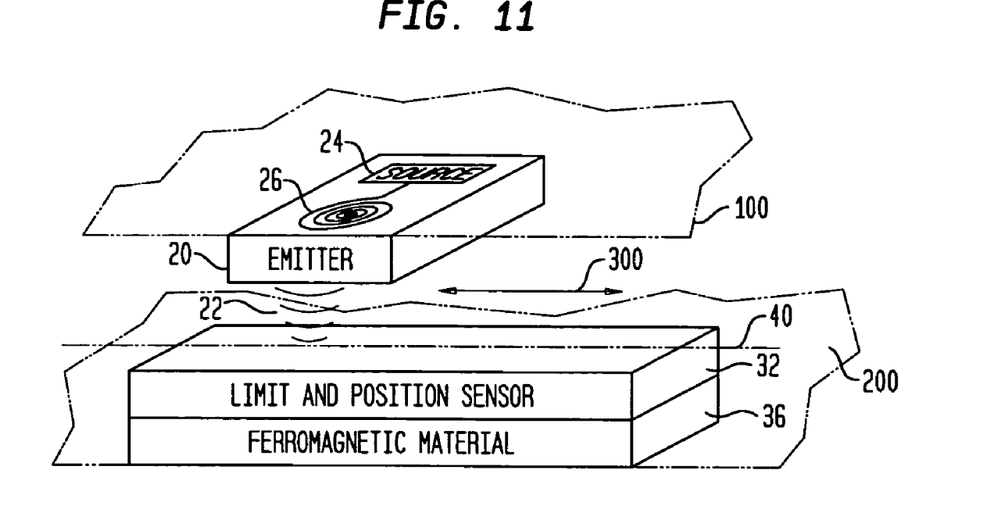
FIG. 11 is a schematic view of a limit and position sensing system in accordance with still another embodiment of the present invention.
Figure 12:
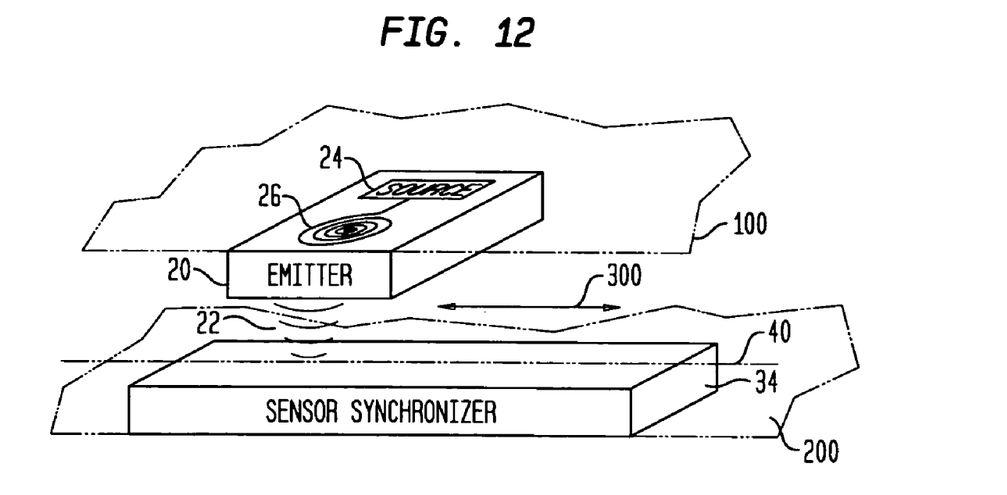
FIG. 12 is a schematic view of a gap sensing system in accordance with another embodiment of the present invention.
Figure 13:
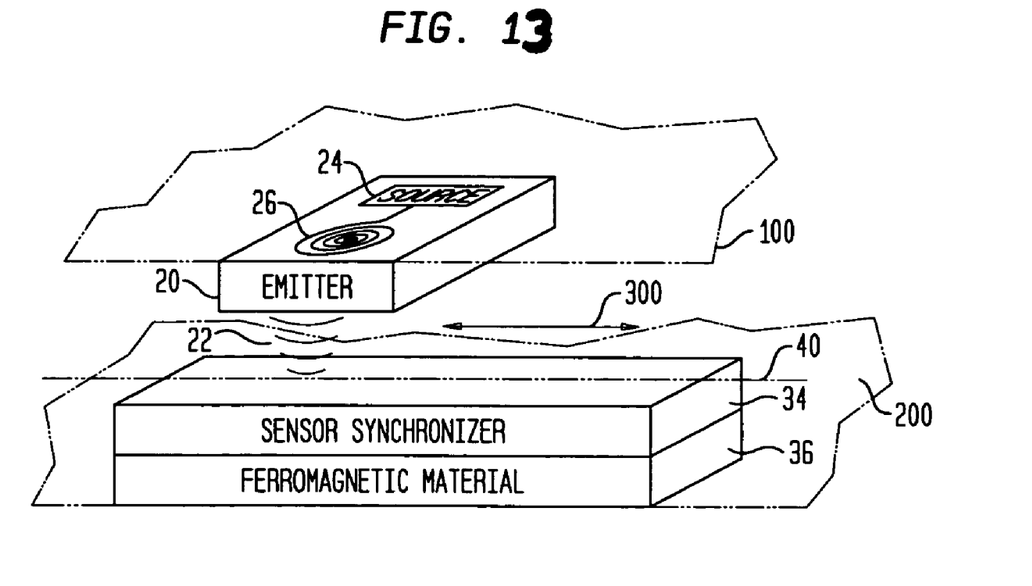
FIG. 13 is a schematic view of another embodiment of a gap sensing system.

For example, depending on application requirements, the sensor assembly used along with emitter 20 could utilize (i) just sensor 32 by itself (FIG. 9), (ii) sensor 32 in conjunction with just sensor synchronizer 34 (FIG. 10), or (iii) sensor 32 in conjunction with just ferromagnetic material 36 (FIG. 11). Still further, the sensor assembly could be configured to simply measure the gap between emitter 20 and the sensor assembly. In such an application, the sensor assembly used along with emitter 20 could utilize (i) just synchronizer 34 by itself (FIG. 12), or (ii) synchronizer 34 in conjunction with ferromagnetic material 36 (FIG. 13).

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired by Letters Patent of the United States is:

1. A limit and position sensing system, comprising:
    a sensor assembly including
    (i) a first electrical conductor arranged in a first plane and having first and second ends, said first electrical conductor coiled outwardly in a clockwise fashion starting at said first end to form a first coil region, said first electrical conductor coiled outwardly in a clockwise fashion starting at said second end to form a second coil region with uniform spacing being defined between rings of said first coil region and said second coil region along an axis of said first plane,
    (ii) a second electrical conductor arranged in a second plane parallel to said first plane, said second electrical conductor forming a single coil with rings thereof being uniformly-spaced and with portions of said rings of said single coil that lie between said first end and said second end of said first electrical conductor being parallel to said axis, and
    (iii) ferromagnetic material arranged in a third plane parallel to said first plane and said second plane, said ferromagnetic material aligned with said first coil region, said second coil region and said single coil such that said ferromagnetic material spans beyond (a) said first end and said second end of said first electrical conductor, and (b) said portions of said rings of said single coil; and
    an emitter spaced apart from said sensor assembly for transmitting a periodic electromagnetic wave towards said sensor assembly to be incident on said first electrical conductor and said second electrical conductor prior to being incident on said ferromagnetic material.

2. A system as in claim 1 wherein said first plane is closer to said emitter than said second plane.

3. A system as in claim 1 wherein said second plane is closer to said emitter than said first plane.

4. A system as in claim 1 wherein said sensor assembly is adapted to be positioned on a first structure and said emitter is adapted to be positioned on a second structure with the first structure and the second structure being capable of relative movement therebetween in a linear direction, said sensor assembly adapted to be positioned on the first structure such that said axis of said first plane is parallel to the linear direction of relative movement.

5. A system as in claim 1 wherein the number of said rings of said first coil region is equal to the number of said rings of said second coil region.

6. A system as in claim 1 further comprising electrically non-conductive substrate means to which said first electrical conductor and said second electrical conductor are coupled.

7. A system as in claim 1 wherein said ferromagnetic material is mu-metal.

8. A limit and position sensing system, comprising:
    a sensor assembly adapted to be coupled to a first structure, said sensor assembly including a first electrical conductor, a second electrical conductor, and ferromagnetic material arranged in electrically-isolated layers with
    (i) said first electrical conductor arranged in a first plane and having first and second ends, said first electrical conductor coiled outwardly in a clockwise fashion starting at said first end to form a first coil region, said first electrical conductor coiled outwardly in a clockwise fashion starting at said second end to form a second coil region with uniform spacing being defined between rings of said first coil region and said second coil region along an axis of said first plane,
    (ii) said second electrical conductor arranged in a second plane parallel to said first plane, said second electrical conductor forming a single coil with rings thereof being uniformly-spaced and with portions of said rings of said single coil that lie between said first end and said second end of said first electrical conductor being parallel to said axis, and
    (iii) said ferromagnetic material arranged in a third plane parallel to said first plane and said second plane, said ferromagnetic material aligned with said first coil region, said second coil region and said single coil such that said ferromagnetic material spans beyond (a) said first end and said second end of said first electrical conductor, and (b) said portions of said rings of said single coil;
    an emitter adapted to be coupled to a second structure, said emitter being spaced apart from said sensor assembly and substantially opposing said axis of said first plane, wherein said third plane of said sensor assembly is further from said emitter than said first and second planes of said sensor assembly, and wherein the first structure and the second structure are capable of relative movement therebetween along a linear direction, said emitter transmitting a periodic electromagnetic wave therefrom when activated; and
    said sensor assembly adapted to be positioned on the first structure such that said axis of said first plane is parallel to the linear direction of relative movement.

9. A system as in claim 8 wherein said first plane is closer to said emitter than said second plane.

10. A system as in claim 8 wherein said second plane is closer to said emitter than said first plane.

11. A system as in claim 8 further comprising an electrically non-conductive substrate having opposing first and second planar sides, said first electrical conductor being coupled to said first planar side and said second electrical conductor being coupled to said second planar side.

12. A system as in claim 8 wherein said ferromagnetic material is a layer of mu-metal.

13. A limit and position sensing system, comprising:
    a sensor assembly including
    (i) an electrically non-conductive substrate having opposing first and second planar sides that are parallel to one another,
    (ii) a first electrical conductor having first and second ends, said first electrical conductor coupled to said first planar side of said substrate, said first electrical conductor coiled outwardly in a clockwise fashion starting at said first end to form a first coil region, said first electrical conductor coiled outwardly in a clockwise fashion starting at said second end to form a second coil region with uniform spacing being defined between rings of said first coil region and said second coil region along an axis that passes through center portions of said first coil region and said second coil region, (iii) a second electrical conductor coupled to said second planar side of said substrate, said second electrical conductor forming a single coil with rings thereof being uniformly-spaced and with portions of said rings of said single coil that lie between said first end and said second end of said first electrical conductor being parallel to said axis, and (iv) ferromagnetic material electrically-isolated from said first and second electrical conductors, said ferromagnetic material aligned with said first coil region, said second coil region and said single coil such that said ferromagnetic material spans beyond (a) said first end and said second end of said first electrical conductor, and (b) said portions of said rings of said single coil; and an emitter spaced apart from said sensor assembly for transmitting a periodic electromagnetic wave towards said sensor assembly to be incident on said first electrical conductor and said second electrical conductor prior to being incident on said ferromagnetic material.

14. A system as in claim 13 wherein said first plane is closer to said emitter than said second plane.

15. A system as in claim 13 wherein said second plane is closer to said emitter than said first plane.

16. A system as in claim 13 wherein said sensor assembly is adapted to be positioned on a first structure and said emitter is adapted to be positioned on a second structure with the first structure and the second structure being capable of relative movement therebetween in a linear direction, said sensor assembly adapted to be positioned on the first structure such that said axis is parallel to the linear direction of relative movement.

17. A system as in claim 13 wherein the number of said rings of said first coil region is equal to the number of said rings of said second coil region.

18. A system as in claim 13 wherein said ferromagnetic material is mu-metal.

\* \* \* \* \*